(12) United States Patent
Wu et al.

(10) Patent No.: US 8,448,807 B2
(45) Date of Patent: May 28, 2013

(54) HANDLE OF DETACHABLE GRILLING PAN

(75) Inventors: Chunyu Wu, Fujian Province (CN); Jianyang Xu, Fujian Province (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 0 days.

(21) Appl. No.: 12/780,319

(22) Filed: May 14, 2010

(65) Prior Publication Data
US 2010/0288775 A1 Nov. 18, 2010

(30) Foreign Application Priority Data

May 14, 2009 (CN) .................. 2009 2 0138422 U

(51) Int. Cl.
*A47L 27/00* (2006.01)
*A47J 36/00* (2006.01)
*A47J 37/01* (2006.01)

(52) U.S. Cl.
USPC ..... 220/573.1; 220/759; 220/756; 220/573.4; 16/425; 16/422

(58) Field of Classification Search
USPC .............. 220/759, 573.1, 756, 573.4; 16/422, 16/425
See application file for complete search history.

(56) References Cited

U.S. PATENT DOCUMENTS

| 2,024,294 | A | * | 12/1935 | Kirsch | 220/759 |
| 2,106,391 | A | * | 1/1938 | Duraj | 294/31.1 |
| 3,269,765 | A | * | 8/1966 | Pryce | 294/31.1 |
| 3,809,285 | A | * | 5/1974 | Unger et al. | 220/759 |
| 4,577,367 | A | * | 3/1986 | Durand | 220/759 |
| 5,373,608 | A | * | 12/1994 | Welch | 16/425 |
| 6,472,644 | B1 | * | 10/2002 | Wu | 219/450.1 |
| 7,424,768 | B2 | * | 9/2008 | Beruscha et al. | 16/422 |
| 7,872,213 | B2 | * | 1/2011 | De Leon et al. | 219/385 |
| 2005/0247209 | A1 | * | 11/2005 | Kuo et al. | 99/372 |
| 2009/0236352 | A1 | * | 9/2009 | Xie et al. | 220/756 |

* cited by examiner

*Primary Examiner* — J. Gregory Pickett
*Assistant Examiner* — Blaine Neway
(74) *Attorney, Agent, or Firm* — Rabin & Berdo, P.C.

(57) ABSTRACT

A handle of a detachable grilling pan has: a main body with a downward opening and a window, both disposed on the top side of the main body, a shaft, a "L" shaped hook and a spring. The main body is connected to the grilling pan by a fixing plate. The "L" shaped hook is hinged to the shaft, and the long straight free end of it extends out the window of the handle, and the short straight free end of it extends out the opening of the handle body and toward the grilling pan. The spring presses against the long straight end to make the free end of the short straight end hook the opening of the shell of the grill. When the long straight part of the hook is pressed, the hook rotates around the shaft and the grilling pan can be removed from the grill shell.

7 Claims, 3 Drawing Sheets

HANDLE OF DETACHABLE GRILLING PAN

FIELD OF THE INVENTION

The present invention relates to a part in a type of grill.

BACKGROUND OF THE INVENTION

The shell of the present detachable grill is a box made of metal. A metal reflecting plate is disposed in the open end plane of the shell. A window is set up in the center of the reflecting plate, and heat conduction metal plate is disposed in the window; the heat conduction metal plate, the reflecting plate and the shell form a enclosed space, and in the space a electric heat tube is fixed to the heat conduction metal plate. The detachable grilling pan is disposed on the outside of the heat conduction plate. When the grilling pan needs to be washed, the grilling pan can be removed from the heat conduction plate, and the top surface (grilling surface) of grilling pan could be washed directly. For convenience, two outward-extension handles are respectively disposed on the two sides of the grilling pan, and user could carry the grilling pan by holding the two handles. If the grilling pan could not be fixed to the heat conduction plate after it is washed, although the grilling pan is placed on the heat conduction plate, the grilling pan would shake. Therefore, a hook against which a spring presses is horizontally disposed on each handle, and the hook hooks the edge of the shell in order to fix the grilling pan to the heat conduction plate. In this way, when the grilling pan needs to be removed from the heat conduction plate, user should press the connection part of the hook in order to compress the spring, so that the hook move and exit from the shell. When the grilling pan needs to be fixed to the heat conduction plate of the shell, the connection part is released and the hook hooks the shell again under the restoring force of the spring. The above said structure solves the problems of taking the grilling pan from the heat conduction plate and fixing the grilling pan to the heat conduction plate, but it also has the following disadvantages: horizontal directive mechanism and limit mechanism need to be disposed on the handle; the components of the structure are too many and the cost is high. Besides, the handles could only place the grilling pan on the top of the shell in the grill, but it could not make the grilling pan contact the only heat source on the shell—the heat conduction plate very well. So the heat loss is big when the grill is working.

SUMMARY OF THE INVENTION

The purpose of the present invention is to provide a handle of the detachable grilling pan, which has the functions of handle and hook. The present invention has advantages of simple structure, convenient to use, and low cost.

The technical solution applied by the present invention is:

A handle of grilling pan, comprises a main body provided with a downward opening and a window which is disposed on the top side of the main body, a shaft, a "L" shaped hook and a spring; said main body is connected to the grilling pan by a fixing plate; said "L" shaped hook is hinged to said shaft, and a free end of the long straight part of said "L" shaped hook extends out of said window, and the free end of the short straight part of said "L" shaped hook extends out of said downward opening and towards said grilling pan; said spring presses against the long straight part of said "L" shaped hook for making the free end of the short straight part of said "L" shaped hooks hooks said downward opening. Press the free end of the long straight part of the hook towards the grilling pan, and then the spring is compressed. The free end of the short straight part of the hook exits from the shell of the grill, and the grilling pan could be removed from the shell of the grill. Release the free end of the long straight part of the hook, and then the restoring force of the spring resets the hook. When the grilling pan is reinstalled, the grilling pan is disposed on the shell of the grill and the free end of the long straight part of the hook is pressed toward the grilling pan. Then the spring is compressed and the free end of the short straight part of the hook move close to the edge of the opening of the shell of the grill. When the free end of the long straight part of the hook is released again, and the restoring force of the spring inserts the free end of the short straight part of the hook into the opening of the shell of the grill in order to fix the grilling pan to the shell of the grill. The present invention has advantages of simple structure, few components, and low cost. However, the handle could make sure that the grilling pan could be steadily fixed to the top of the shell of the grill, and could be removed from the shell quickly.

Said downward opening comprises a lower cover provided with a gap for making, the short straight part of said "L" shaped hook extending out of it. The lower cover covers the opening of the handle body in order that fingers of user could not insert into the handle body, so it is safe to use and is convenient to wash.

Said lower cover further comprises a projecting lug toward said main body; said shaft is disposed on said projecting lug. The hook could be firstly disposed on the shaft of the projecting lug of the lower cover, and the lower cover, handle body and the fixing plate are fixed together. So the handle is convenient to assemble.

Said spring is a torsion spring, so torsion spring is fit for the narrow and small space of the handle body.

The handle of the present invention in which shaft, hook, and spring are disposed realizes that when the free end of the long straight part of the hook is pressed or released, the hook would rotate around the shaft and form an included angle; so the free end of the short straight part of the hook could exit from the opening of the shell of the grill and the grilling pan could be removed from the shell of the grill, or the free end of the short straight part of the hook could hook the opening of the shell of the grill and the grilling pan could be fixed on the shell of the grill. The handle of the detachable grilling pan doesn't move in any motion. So when the grill is being carried, the hook also make sure that the grilling pan and the shell of the grill are in tight contact with each other, which avoid the problem that the grilling pan slides away from the shell. The present invention supplies the handle of the detachable grilling pan that can make the grilling pan and the shell of the grill in tight contact with each other and reduce the working heat loss. Besides the handle in the present invention makes the grill safer to use and more convenient to use.

DESCRIPTION OF SPECIFIC EMBODIMENTS

Figure 1:
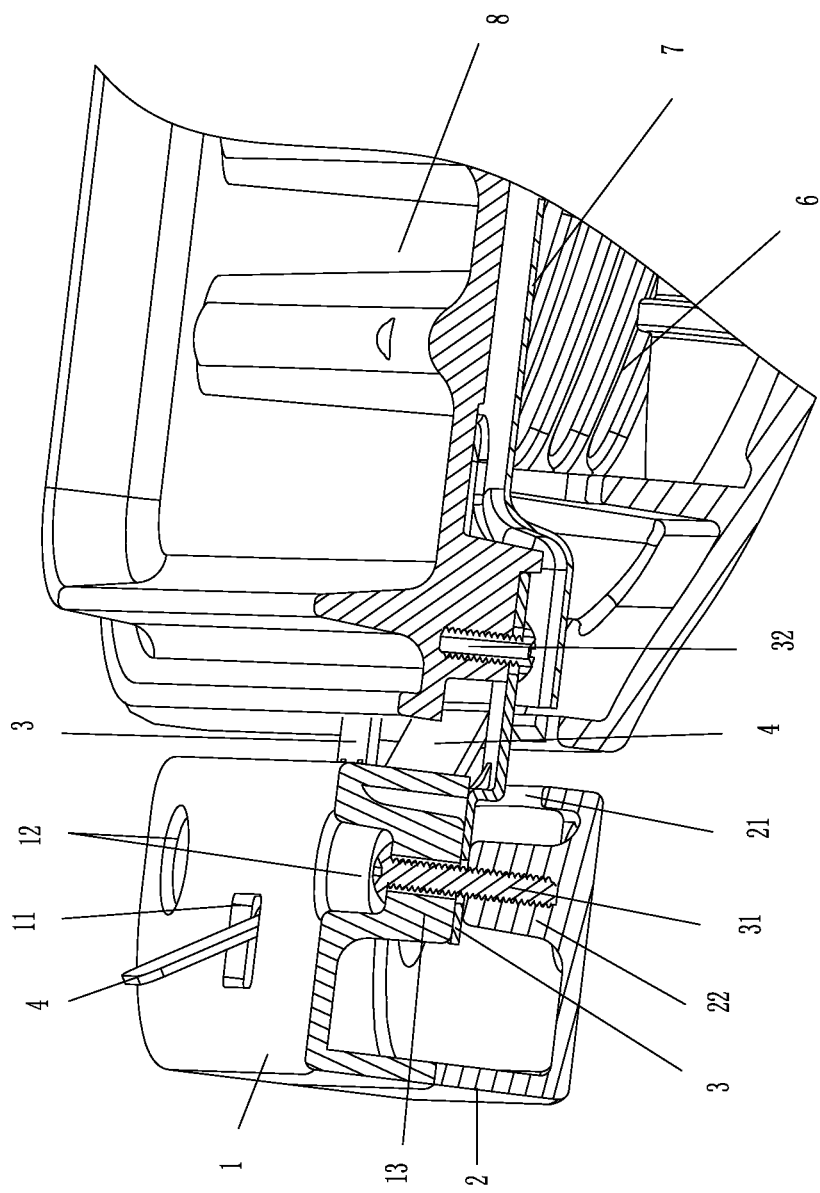
FIG. 1 is a perspective view illustrating a connection structure that in an embodiment the handle of the present invention in the detachable grilling pan and the relevant parts of the grill together form.

Referring to FIG. 1, in an embodiment the handle of the present invention in the detachable grilling pan and the relevant parts of the grill together form a connection structure. The grill is a detachable grill; the shell 6 is a box made of insulating material. A reflecting plate 7 which is made from metal is disposed on the open end plane of the shell 6. A window is disposed in the center of the reflecting plate 7, and a heat conduction metal plate is disposed in the window. The heat conduction metal plate, the reflecting plate 7 and the shell 6 form a enclosed space, and in the space a electric heat tube is fixed to the heat conduction metal plate. The detachable grilling pan 8 is disposed on the outside of the heat conduction plate. Two handles are respectively set up in the two sides of the grilling pan 8, which are symmetrical. Referring to FIG. 1, the left handle is described in the following description, because the two handles are symmetrical, the description of the right handle is omitted.

The left handle comprises a body 1, a lower cover 2, a fixing plate 3, a hook 4 and a spring 5 which is not described in FIG. 1.

The box-shaped body 1 of the handle is made of adiabatic material. The body 1 has a downward opening, a window 11 in the top and two stepped holes 12 in the top; in the body 1, downward extension projections 13 are set up to correspond with the stepped holes 12.

Figure 2:
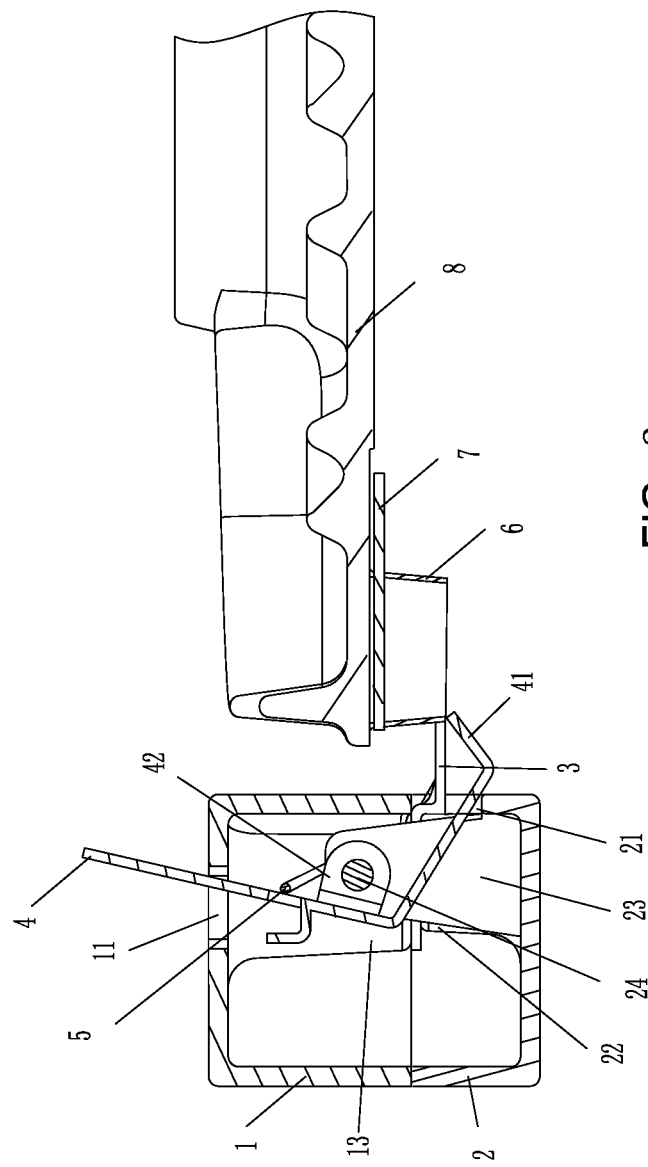
FIG. 2 is a sectional view of the handle of the detachable grilling pan of the present invention in an embodiment, when the detachable grilling pan is released.

The box-shaped lower cover 2 is made of adiabatic material. The opening of the lower cover 2 is upward, and the size and shape of the upper end plane correspond with the lower end plane of the body 1. The side of the lower cover 2 close to the grill shell 6 has a gap 21; in the lower cover 2, upward extension projections 22 are set up to correspond with the projections 13 of the body 1, and screw holes are disposed in the projections 22 to correspond with the stepped holes 12 of the projections 13. Referring to FIG. 2, projecting lugs 23 disposed in the lower cover 2 extend upwards and project out of the side of the lower cover 2, and a shaft is disposed above the projecting lugs 23.

The fixing plate 3 made of metal, is shaped like "☐", and the lower part of the hook 4 could pass through the square hole in the fixing plate 3.

Referring to FIG. 2, the metal hook 4 is in the shape of "L". An up-bending hook part 41 is disposed on the free end of the short straight part of the hook 4; a projecting lug 42 with a shaft hole in it, is disposed on the long straight part, close to the bending part. The shaft 24 above the projecting lugs 23 of the lower cover 2 is sheathed with the shaft hole of the projecting lug 42. The spring 5, which is a torsion spring, is disposed on the projecting lug 42. One end of the spring 5 press against the long straight part of the hook 4, and the other end fixed to the projecting lug 42. The fixing plate 3 pass through the gap 21 of the lower cover 2 and is disposed on the projecting lug 22 of the lower cover 2, and the handle body 1 cover the lower cover 2. The free end of the long straight part of the hook 4 extends out of the window 11 of the handle body 1; the screw 31 extends out of the stepped hole 12 of the handle body 1 and the hole of the fixing plate 3, and is fixed in the screw hole of the projection 22 of the lower cover 2. The free end of the short straight part of the hook 4 passes through the opening of the handle body 1 and the gap 21 of the lower cover 2, and extends toward the grilling pan 8. The fixing plate 3 is fixed under the grilling pan 8 by the screw 32.

Figure 3:
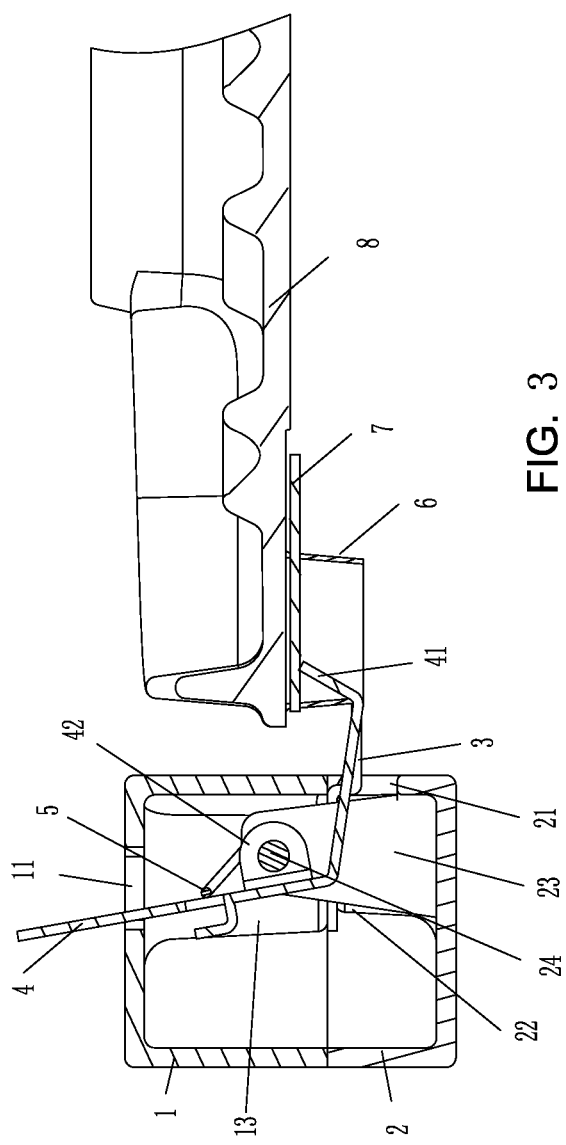
FIG. 3 is a sectional view of the handle of the detachable grilling pan of the present invention in an embodiment, when the detachable grilling pan is fixed.

Referring to FIG. 3, the spring 5 in the handle body 1 presses against the long straight part of the hook 4 in order to insert the hook part 41 of the free end of the short straight part into the shell 6 of the grilling pan 8. The hook 4 make sure that the grilling pan 8 and the shell 6 of the grill can be connected tightly in order to make the grilling pan 8 and heat conduction plate in tight contact with each other.

Referring to FIG. 2, if the grilling pan 8 needs to be washed, press the free end of the long straight part of the "L" shaped hook 4 toward the grilling pan 8, and then the spring 5 is compressed. The hook part 41 of the free end of the short straight part of the "L" shaped hook 4 exits from the shell 6 of the grill, and the grilling pan 8 could be removed from the shell 6 of the grill. Release the free end of the long straight part of the "L" shaped hook 4, and then the restoring force of the spring 5 resets the "L" shaped hook 4.

When the grilling pan 8 is reinstalled, the grilling pan 8 is disposed on the shell 6 of the grill and the free end of the long straight part of the "L" shaped hook 4 is pressed toward the grilling pan 8. Then the spring 5 is compressed and the hook part 41 the free end of the short straight part of the "L" shaped hook 4 move close to the edge of the opening of the shell 6 of the grill.

Referring to FIG. 3, when the free end of the long straight part of the "L" shaped hook 4 is released again, and the restoring force of the spring 5 inserts the hook part 41 of the free end of the short straight part of the "L" shaped hook 4 into the opening of the shell 6 of the grill in order to fix the grilling pan 8 to the shell 6 of the grill.

All above is just a preferred embodiment of the present invention, so the present invention should not be limited in these embodiments. In a word, it should be understood that according to the scope of the present invention and the content of the description, all the various equivalent modifications and alterations will be apparent in the scope and spirit of this invention. Therefore, the scope and sprit of the invention is limited only by the claims.

What is claimed is:

1. A grill, comprising:
    a shell;
    a grilling pan removably disposed on said shell;
    a fixing plate attached to said grilling pan; and
    a handle attached to said grilling pan by way of said fixing plate, said handle including:
        a main body provided with a downward opening and a window which is disposed on a top side of the main body, said main body being attached to said fixing plate;
        a shaft;
        an "L" shaped hook hinged to said shaft, and including a long straight part having a free end extending out of the window, and a short straight part having a free end extending out of the downward opening and towards said grilling pan, the free end of the short straight part having a hook part formed thereon; and
        a spring, said spring pressing against the long straight part of said "L" shaped hook to cause the hook part to be inserted into an opening of the shell and to be pressed against said shell, to thereby vertically press the shell against the grilling pan disposed thereon, such that the shell and the grilling pan are in tight contact with each other to reduce heat loss, wherein
    the free end of the long straight part is movable towards the grilling pan under a horizontal force applied thereto, to thereby release the free end of the short straight part hooked to the shell.

2. The grill according to claim 1, wherein said handle further comprises a lower cover provided with a gap having the short straight part of said "L" shaped hook extending out of it.

3. The grill according to claim 2, wherein said lower cover further comprises a lug projecting toward said main body; said shaft being disposed on said lug.

4. The grill according to claim 1, wherein said spring is a torsion spring.

5. The grill according to claim 1, wherein said fixing plate is attached to said grilling pan with a threaded fastener.

6. The grill according to claim 1, wherein said fixing plate attached to said main body with a threaded fastener.

7. The grill according to claim 1, wherein said fixing plate secures said handle to said grilling pan, both when the short straight part of said "L" shaped hook releasably hooks said shell, thereby attaching said grilling pan to said shell, and when the short straight part of said "L" shaped hook is disengaged from said shell, thereby allowing said grilling pan to be removed from said shell.

\* \* \* \* \*